Sept. 8, 1970   J. P. SMITH   3,527,430
PROTECTIVE AIR CURTAINS FOR AIRCRAFT ENGINE INLETS
Filed Oct. 25, 1968

John Phillip Smith  Inventor
By Dowell H Dowell  Attorneys

United States Patent Office 3,527,430
Patented Sept. 8, 1970

3,527,430
PROTECTIVE AIR CURTAINS FOR AIRCRAFT ENGINE INLETS
John Phillip Smith, Harpenden, England, assignor to Hawker Siddeley Aviation Limited, Kingston-upon-Thames, Surrey, England, a British company
Filed Oct. 25, 1968, Ser. No. 770,617
Claims priority, application Great Britain, Oct. 25, 1967, 48,560/67
Int. Cl. B64d 33/02
U.S. Cl. 244—53
8 Claims

ABSTRACT OF THE DISCLOSURE

An aircraft jet engine air intake arrangement in which, in order to avoid stones and debris being ingested when the aircraft is on the ground, an air curtain is blown from a forwardly-projecting tube to isolate from the general intake air flow that region of the ground from which loose material might otherwise be lifted.

DESCRIPTION OF INVENTION

Figure 1:
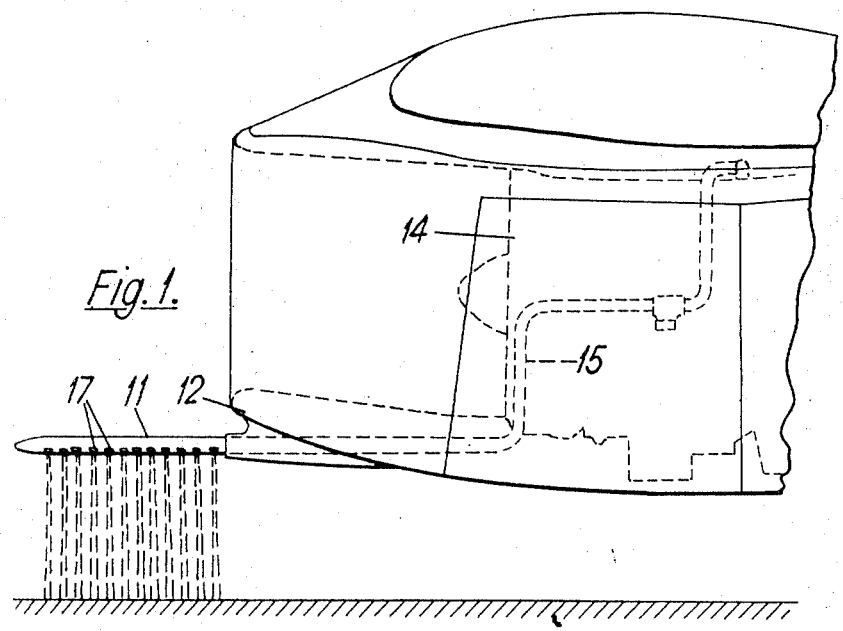

This invention is concerned with the problem of aircraft jet engines sucking in stones and other loose particles which may be lying on the ground in the path of the aircraft while it is static, taxiing or taking off. This problem varies in severity according to the location of the engine on the aircraft, but is most severe when the engines are places underneath the wing which, of necessity, brings each engine fairly close to the ground.

The cause of the severe ingestion problem is understood to be the formation of a vortex from the intake to the ground which is generated under certain conditions due to the interaction of the general air flow into the intake with an irregularity in the ambient atmospheric flow. At the centre of this vortex there is a very considerable reduction in pressure which can lift sizable stones from the ground so that they then enter the intake and can cause considerable damage to the engine. The position in relation to the aircraft at which the vortex meets the ground plane is not a fixed point in any particular case but varies considerably with external wind conditions.

In a previous proposal for solving this problem, a jet of air has been directed from the lower part of the intake lip in a direction inclined forward and downward with the object of disturbing the pattern of air flow on the ground surface so as to establish a condition under which a vortex cannot form. However, due to the local nature of the disturbance produced by a single fixed jet and the variation of the vortex position with ambient conditions only limited success has been achieved using this proposal.

According to the invention the solution now proposed and which has been found satisfactory on an experimental installation is substantially to isolate the air stream coming into the engine intake, from the region of the ground from which loose particles might possibly be ingested, by means of a sheet or curtain of air. This desirable isolation can be achieved by blowing from slits or holes arranged in series or groups which deliver air in a downward and sideways direction.

In the preferred arrangement, a blowing tube extends forward below and in front of the engine intake. This tube receives high pressure air from the engine compressor and the air is discharged to atmosphere, either through slits along the side of the tube or through a series of discrete nozzle holes in the tube. While the exact angle at which the air should issue is liable to vary with individual installations and with the height above the ground at which it is practicable to place the tube in each individual case, it is considered that blowing horizontally is not advantageous. The aim should be to keep the blown sheet of air as far away from the intake as possible to minimise the tendency for it to become absorbed into the general inflow into the intake; at the same time the blown sheet should not impinge on the ground too close to the centre line of the intake, due to the danger of it then disturbing loose debris, some of which may fly into the air and be ingested. Considerations of ground clearance with the undercarriage fully compressed will also limit the position of the tube.

As an example of a case in which success has been achieved experimentally, the best results for an engine intake of approximately 3 ft. diameter, the lower lip of which was 2'8" above the ground, were obtained from a tube placed centrally beneath the intake, 12 inches from the ground. The tube itself extended from a point immediately beneath the intake lip forward to a point such that the width of the blown sheet was approximately equal to the intake diameter. There were about 14 holes on each side of the tube 30° below the horizontal. Each hole was about .01" in diameter and the total air flow required effectively to stop foreign matter being sucked from the ground amounted to approximately ¼% of the mass flow of the engine concerned.

It may be desirable to have more than one row of nozzles on either side of the centre line of the tube and in some cases a further row on the centre line blowing vertically downward may be advantageous.

Figure 2:
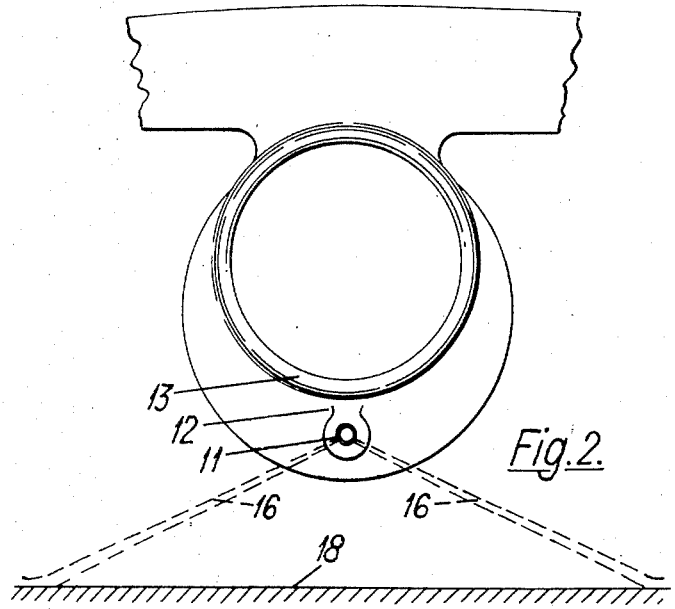

In the accompanying diagrammatic drawings, there is an illustration of a typical installation, shown by way of example. The blowing tube 11 has two series of holes or nozzles 17 and emerges through the underside of the engine cowling, being carried from the support 12 centrally below the lower lip of the intake 13. The tube is supplied with air from the high pressure compressor of the engine 14 through concealed ducting 15. In FIG. 2 it can be seen how the two sheets of air 16 emerge at opposite sides of the tube 11 and are directed laterally with a downward inclination so as to curtain off the ground region 18 below from the air stream entering the air intake above.

The tube need not be very large and is readily detachable when the aircraft is operating from surfaced runways on which the use of the device may not be necessary. Since the vortex induced ingestion problem is only present at comparatively low forward speeds and static conditions on the ground, a speed sensitive switch can be inserted in the delivery pipe 15 which will close off the supply of air to the tube above a predetermined speed in the course of the ground run, thus ensuring that the available engine thrust is not diminished by bleeding air from the compressor during the high speed part of the take-off run and the subsequent climb away.

The disposal of the air outlets to create the air sheets may vary considerably within the scope of the invention. For instance, it might be possible to arrange the holes in the form of a series of nozzles blowing radially from a central spray hose rather than linearly disposed as in the drawings.

I claim:

1. An aircraft jet engine air intake arrangement for a forward-facing air intake, to prevent ingestion of stones or debris into the engine, comprising multiple nozzle means mounted under the engine intake and disposed to blow curtains of air downwardly toward the ground from the aircraft in at least two laterally-diverging directions so that there is a quiescent ground area between the regions of the ground upon which the two air curtains impinge.

2. An arrangement according to claim 1, wherein said means comprises a blowing tube extending forward below and in front of the engine intake, which blowing tube receives high pressure air from the engine compressor.

3. An arrangement according to claim 2, wherein the air is discharged through at least two rectilinear rows of holes or slits along opposite sides of the blowing tube.

4. An arrangement according to claim 3, wherein each row of holes or slits is arranged to blow an air curtain laterally outward and downward from the tube.

5. An arrangement according to claim 2, wherein the blowing tube emerges at a point centrally beneath the intake through the underside of a cowling around the forward end of the engine.

6. An arrangement according to claim 2, wherein the blowing tube is readily removable from the aircraft.

7. An arrangement according to claim 1, wherein the amount of air blown is less than 1% of the mass flow of the respective engine.

8. An arrangement according to claim 1, wherein a speed-sensitive switch is arranged to cut off the delivery of air to the blowing means when a predetermined ground speed is exceeded by the aircraft.

References Cited

UNITED STATES PATENTS

| 3,298,637 | 1/1967 | Lee | 244—53 |
| 3,387,456 | 6/1968 | Feder et al. | 244—53 X |

FOREIGN PATENTS 855,980  12/1960  Great Britain.

TRYGVE M. BLIX, Primary Examiner

J. E. PITTENGER, Assistant Examiner

U.S. Cl. X.R.

60—39.09